April 16, 1968  J. M. POWERS ET AL  3,378,486
PURIFICATION OF NORMAL PARAFFINS
Filed Dec. 28, 1965
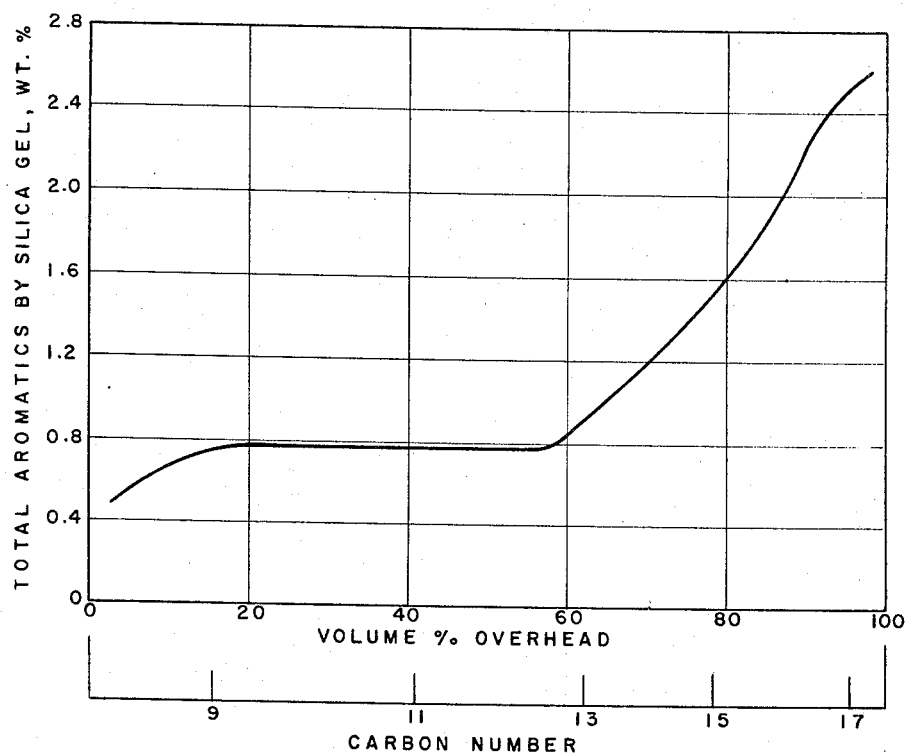
INVENTORS.
JOHN M POWERS,
BY DELBERT E. COKER,
ATTORNEY.

3,378,486
PURIFICATION OF NORMAL PARAFFINS
John M. Powers and Delbert E. Coker, Baytown, Tex., assignors to Esso Research and Engineering Company, a corporation of Delaware
Filed Dec. 28, 1965, Ser. No. 516,955
4 Claims. (Cl. 208—310)

ABSTRACT OF THE DISCLOSURE

In contacting a 300° F.–600° F. kerosene with a molecular sieve, the distribution of aromatic hydrocarbon impurities in the desorbate is shifted in favor of higher boiling materials. It has been found that an incremental improvement in the high-purity n-paraffin product can be obtained by fractionating the product and removing that portion which boils above 485° F. (preferably removing that portion which boils above 470° F.).

---

The present invention relates to the improvement in quality of n-paraffin products desorbed from a molecular sieve, particularly when the n-paraffin products are obtained from a feedstock in the kerosene boiling range. The present invention is directed to the fractionation of the desorbate product from a 5 A. sieve to discard the hydrocarbons boiling above a cutoff point of 470° F. to 485° F., whereby the n-paraffin purity is increased and the aromatics content is decreased.

Normal paraffins are currently employed for many purposes, from use as solvents to use as reactants in producing biodegradable detergents. In many uses, the n-paraffin purity must be very high (e.g., >97%). Further, the nature of the impurities making up the remaining 3% is sometimes important: in the production of biodegradable detergents, the presence of aromatic hydrocarbons is deleterious, since they interfere with the sulfonation of the n-paraffins. In high-purity specialties of this nature, incremental increases in purity (and decreases in specified impurities) are of great commercial value. For example, to obtain a reduction in aromatic hydrocarbons, the n-paraffin desorbate product is sometimes hydrogenated, converting aromatics to naphthenes. However, there is sometimes an objection to the naphthenes as well as to the aromatic hydrocarbons. The present invention provides an alternative to hydrogenation in obtaining incremental decreases in aromatics content of the desorbate.

Hydrocarbons are retained by molecular sieve beds in at least three ways:

(1) n-Paraffins pass through the 5 A. pores into a "cage" within the sieve, and are hereinafter referred to as "absorbed in the pores";

(2) Polar hydrocarbons are preferentially absorbed on the exterior surface of the sieve exposed between the pore openings; and (3) Hydrocarbons retained in the void volume of the sieve bed.

The recovery of n-paraffins by adsorption on molecular sieves has become well known. This recovery is accomplished by contacting a n-paraffin-containing hydrocarbon stream with a bed of sieve pellets, generally one-sixteenth inch or one-eighth inch in nominal diameter. The hydrocarbon feed stream is passed in contact with the bed for a short time, usually for a time sufficient to adsorb substantially all of the n-paraffins in the feed stream or long enough to substantially completely saturate the sieve bed with n-paraffins, depending on the amount of n-paraffins which are to be passed on with the sievate (i.e., hydrocarbons not adsorbed from the feed stream).

The feed stream is discontinued. At this point the bed contains not only n-paraffins absorbed in the sieve pores (and some of each type of hydrocarbon adsorbed on the sieve surface) but also contains a small amount of the feed stream retained in the void volume of the bed. The hydrocarbons retained in the void volume of the bed are hereinafter referred to as "physically trapped hydrocarbons." As is more specifically pointed out below, these physically trapped hydrocarbons are purged from the bed and discarded or recycled into the feed stream for a subsequent adsorption step.

Surface adsorption favors highly polar hydrocarbons, such as the aromatic hydrocarbons. It is contemplated that akyl-substituted aromatic hydrocarbons may be, at least in part, retained by the intrusion of the alkyl substituent into one of the 5 A. pores. This type of adsorption is herein considered to be a type of surface adsorption.

The adsorbed n-paraffins can be released from the bed either by displacement by another material, or by using a gas sweep, or by lowering the pressure to obtain a vaccum. Displacement or a gas sweep is normally used for heavier n-paraffins e.g., those in the $C_{11}$ to $C_{14}$ range. Ammonia gas has been found to be suitable. For $C_6$ to $C_8$ n-paraffins, a vacuum desorption is suitable, employing a pressure of about 1 p.s.i.a. at a temperature of about 600° F.

Regardless of the mode of desorption which is employed, the first hydrocarbons which are removed from the bed are the physically trapped hydrocarbons from the feed stream. After they are removed, the adsorbed n-paraffins (and aromatics) are removed. Since the total volume of all hydrocarbons which are given up by a particular bed in each desorption step can be determined, as well as the proportion of that total which is attributable to physically trapped hydrocarbons, it is possible to segregate the first portion which has essentially the same composition as the feed stream (but not always identical thereto), and subsequently to use it as part of the feed stream in a later adsorption step. As an example, it has been found satisfactory in one case to segregate the first 12% of the hydrocarbons recovered in a desorption step. This can be done by condensing the hydrocarbons and segregating a constant initial volume each time the bed is desorbed, or by diverting a given volume of vapors during the initial portion of the desorption step.

The desorbate product (the material recovered after segregation of the recycle hydrocarbons) is high in n-paraffins, but contains a minor amount of impurities, such as isoparaffins, cycloparaffins, and aromatic hydrocarbons. It has been found that the aromatic hydrocarbon level in the desorbate is consistent at about 0.5% to 2% by weight (usually 1 to 1.5%), regardless of the boiling range of the hydrocarbon feed stream.

Surprisingly, however, it has been found that the higher-boiling aromatic hydrocarbons are adsorbed preferentially to the lower boiling aromatic hydrocarbons so that, by distilling the desorbate to discard a high-boiling moiety, the aromatic content can be reduced and the n-paraffin purity is increased.

The present invention can be understood by the the following discussion and by reference to:

The figure, which shows the aromatic hydrocarbon distribution in a desorbate product.

Suitable feedstocks for use in the present invention are hydrocarbon streams in the kerosene boiling range—from about 300° F. to about 600° F. The preferred range is from about 350° F. to about 550° F. A typical feedstock may boil from 200° F. to 600° F. The desorbate from this feedstock is shown in Table I, infra.

The molecular sieve can be a synthetic zeolite, such as that manufactured by Union Carbide and Carbon Company and sold under the name "Linde Molecular Sieve Type 5A." It has an empirical formula of $$Ca_{4.5}Na_3[(AlO_2)_{12}(SiO_2)_{12}] \cdot 30H_2O$$

The sieve can be used in one-sixteenth inch or one-eighth inch pellets.

The present invention contemplates passing a vaporized n-parafin-containing hydrocarbon stream (preferably boiling in the kerosene range) in contact with a bed of 5 A. molecular sieve. This is carried on at about 5 p.s.i.g. and 650° F. until from about 0.01 to about 0.2 pound of n-paraffin in said hydrocarbon stream has been passed per pound of sieve in the bed. The bed is then purged with ammonia vapor to displace the adsorbed normal paraffins by the action of the ammonia gas which is passed in contact with the bed until from 0.01 to 1.0 (preferably about 0.045) pound of $NH_3$ gas per pound of bed has been employed. The temperature of the desorption is about 600° F. to 700° F. (preferably about 650° F.) at a pressure of 0 to 10 p.s.i.g. (preferably 5 p.s.i.g.).

Vapors from the sieve bed are then passed through a condenser to liquefy the hydrocarbons and to remove the ammonia as a non-condensible gas stream. A first portion of the hydrocarbons may be withdrawn during the initial stages of the desorption step and segregated for recycle. A second portion (about 88% of the total desorbed hydrocarbons) is recovered as desorbate product rich in hydrocarbons. This desorbate product may contain about 96% to 97% n-paraffins, 1% to 1.5% isoparaffins, 1.5 to 2% cycloparaffins, and about 1% to 2% aromatics. The desorbate product is then fractionated to obtain a product of $C_{11}$ to $C_{14}$ n-paraffins of 98+% purity and containing a lower percentage of aromatic hydrocarbons than are present in the desorbate. This is accomplished by precise fractionation to obtain a final product boiling within the range of 400° F. to 485±15° F.

The present invention can better be understood by reference to the following table which illustrates the aromatics distribution of the desorbate being introduced into the fractionator, and the total aromatics contents of (1) the desired $C_{11}$ to $C_{14}$ product, (2) the overhead product, and (3) the bottoms product.

TABLE I.—DISTRIBUTION OF AROMATICS IN DESORBATE [1]

| Fraction, vol. percent | Boiling Range, °F. | Wt. percent Aromatics |
|---|---|---|
| 0–5.4 | 212–276 | 0.5 |
| 10–20.7 | 287–324 | 0.8 |
| 30.8–41.0 | 353–382 | |
| 50.9–60.9 | 414–430 | 0.8 |
| 70.5–80.6 | 482–517 | |
| 90.5–92.3 | 506–571 | |
| 92.3–94.1 | 571–574 | 2.5 |
| 94.1–96.2 | 574–577 | |
| 96.2–98.2 | 577–579 | 2.6 |

[1] Obtained by analysis of selected fractions.

Total aromatics=1.1 wt. percent.
Fractionated:
  Desorbate=1.1 wt. percent aromatics.
  Overhead=0.7 wt. percent aromatics.
  $C_{11}$–$C_{14}$=0.9 wt. percent aromatics.
  Bottoms=2.0 wt. percent aromatics.

EXAMPLE

Referring to the figure and to Table I it is seen that the aromatic hydrocarbons in the desorbate are unevenly distributed, higher concentrations occurring in the upper portion of the boiling range. In the last 20% of the boiling range, the desorbate contains 2.2% aromatic hydrocarbons. In the next to the last 20%, the desorbate contained 1.2% aromatic hydrocarbons. These higher concentrations of aromatic hydrocarbons allow the purity of the n-paraffins to be increased by selectively discarding the fractions containing the higher-boiling materials. Thus, by discarding the material which boils higher than $C_{14}$ (i.e., above a cutoff point of 485° F.), the aromatic hydrocarbon content of the desorbate can be decreased from about 1.1% to about 0.9%. By discarding the $C_{13}$+ hydrocarbons (i.e., above a cutoff point of 470° F.), the aromatic hydrocarbon content can be reduced to about 0.8%.

Thus, it is seen from the example that, by recognizing the uneven distribution of aromatic hydrocarbons in the desorbate which results from the selective action of the sieve, the present inventors have been able, by a simple fractionation step, to obtain a valuable incremental increase in n-paraffin purity.

We claim:
1. In the process of separating n-paraffins from a hydrocarbon stream boiling in the range of about 300° F. to about 600° F., which contains n-paraffins in admixture with an aromatic hydrocarbon and at least one member selected from the group consisting of cycloparaffins and isoparaffins
  by contacting said hydrocarbon stream in the vapor phase with a molecular sieve having pores of substantially uniform size and about 5 A. in diameter, and obtaining a n-paraffin-rich desorbate product from said sieve,
  the improvement of
    fractionating said desorbate product to separate from the n-paraffin product at a cutoff point from 470° F. to 485° F. that portion of the desorbate boiling above the cutoff point, as a bottoms stream enriched in aromatic hydrocarbons.
2. A process as set forth in claim 1 wherein the cutoff point is 470° F.
3. A process which comprises
  passing a vaporized, n-paraffin-containing hydrocarbon stream boiling in the range of about 300° F. to about 600° F. through a bed of a synthetic zeolite molecular sieve having an empirical formula of

$$Ca_{4.5}Na_3[(AlO_2)_{12}(SiO_2)_{12}] \cdot 30H_2O$$

at a temperature of about 600° F. to about 700° F. and a pressure of about 0 to about 15 p.s.i.g. until from about 0.01 pound to about 0.2 pound of n-paraffins in the feed has been passed per pound of sieve in the bed,
  whereby n-paraffins are adsorbed on said bed,
  terminating the flow of said hydrocarbon stream,
  passing ammonia gas through said bed at a temperature of 600° F. to 700° F. and a pressure of 0 to 10 p.s.i.g. until from about 0.01 pound to about 1.0 pound of ammonia has been passed per pound of sieve in the bed,
  whereby adsorbed hydrocarbons and physically trapped hydrocarbons are desorbed and removed from said bed,
  segregating as a trapped-hydrocarbon purge product the first portion of hydrocarbons which are removed from said bed,
  recovering the second portion of hydrocarbons which are removed from said bed as a desorbate product rich in n-paraffins and containing from 0.5% to 2% aromatic hydrocarbons,
  and fractionally distilling said desorbate product at a cutoff point of 470° F. to 485° F. to obtain a n-paraffin product boiling within the range of 400° F. to 485±15° F. which contains proportionally less aromatic hydrocarbons than are contained in said desorbate product, and a bottoms stream enriched in aromatic hydroacrbons.
4. A process as set forth in claim 3 wherein
  the adsorption is accomplished at a temperature of about 650° F. and a pressure of about 5 p.s.i.g.,
  the desorption step is accomplished at a temperature of about 650° F. and a pressure of about 5 p.s.i.g.,
  the desorbate product contains about 1.1% aromatic hydrocarbons, the n-paraffin product has a boiling range of 400° F. to 485° F., and the cutoff point is 485° F.

References Cited

UNITED STATES PATENTS

| | | | |
|---|---|---|---|
| 2,918,511 | 12/1959 | Carter et al. | 260—676 |
| 2,921,026 | 1/1960 | Fleck et al. | 208—310 |
| 3,227,647 | 1/1966 | Krane | 208—310 |
| 3,291,726 | 12/1966 | Broughton | 208—310 |

HERBERT LEVINE, *Primary Examiner.*

DELBERT E. GANTZ, *Examiner.*